(12) United States Patent
Haines et al.

(10) Patent No.: US 6,621,652 B2
(45) Date of Patent: Sep. 16, 2003

(54) DRIVE WITH STREAMING-OPTIMIZED WRITE VALIDATION

(75) Inventors: Jonathan Williams Haines, Lafayette, CO (US); Brian John Higley, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/910,642

(22) Filed: Jul. 20, 2001

(65) Prior Publication Data

US 2002/0078413 A1 Jun. 20, 2002

Related U.S. Application Data

(60) Provisional application No. 60/220,727, filed on Jul. 26, 2000.

(51) Int. Cl.[7] .................. G11B 5/596; G11B 19/04; G11B 5/09
(52) U.S. Cl. .................. 360/77.08; 360/53; 360/60
(58) Field of Search .................. 360/53, 77.02, 360/77.08, 77.07, 69, 60, 31, 75; 714/748, 6, 769, 710

(56) References Cited

U.S. PATENT DOCUMENTS

| | | | |
|---|---|---|---|
| RE33,328 E | 9/1990 | Director .................. | 364/200 |
| 5,126,895 A | 6/1992 | Yasuda et al. .................. | 360/77.07 |
| 5,276,662 A | 1/1994 | Shaver, Jr. et al. .................. | 369/32 |
| 5,392,290 A | 2/1995 | Brown et al. .................. | 371/10.1 |
| 5,570,244 A | 10/1996 | Wiselogel .................. | 360/60 |
| 5,909,334 A * | 6/1999 | Barr et al. .................. | 360/53 |
| 6,134,610 A * | 10/2000 | Chung .................. | 710/55 |
| 6,252,731 B1 | 6/2001 | Sloan et al. | |
| 6,429,990 B2 * | 8/2002 | Serrano et al. .................. | 360/60 |

FOREIGN PATENT DOCUMENTS

| | | |
|---|---|---|
| JP | 05101358 | 4/1993 |
| JP | 11110931 | 4/1999 |
| WO | WO 97/22966 A1 | 6/1997 |
| WO | WO 01/31651 A1 | 5/2001 |

* cited by examiner

Primary Examiner—Andrew L. Sniezek
(74) Attorney, Agent, or Firm—David K. Lucente; Derek J. Berger (57) ABSTRACT

A method, disc drive, and data handling system for optimizing the data writing/transmitting process are disclosed. The disc drive implemented method involves detecting at a current burst whether data written to a previous wedge is recoverable and making the disc drive's buffer space holding that data available for holding other data when the written data is recoverable. The disc drive implemented method also involves detecting at the current burst whether data to be written to a following wedge will encroach upon data written in adjacent tracks and allowing the data to be written in the following wedge when the encroachment is not too severe.

24 Claims, 3 Drawing Sheets

DRIVE WITH STREAMING-OPTIMIZED WRITE VALIDATION

RELATED APPLICATIONS

This application claims priority of U.S. provisional application Ser. No. 60/220,727 filed on Jul. 26, 2000.

FIELD OF THE INVENTION

This application relates generally to disc drives. More particularly, this application relates to the optimization of writing or transmitting data.

BACKGROUND OF THE INVENTION

Disc drives have magnetic media on discs that are rotated while read and write heads communicate magnetic signals to and from the magnetic media on the surfaces of the rotating disc. The magnetic signals are generally written in tracks arranged in generally concentric circles about the center of rotation of the magnetic disc. During manufacturing, servo bursts are written onto the magnetic disc to divide the disc into several arcuately spaced radial wedges. A set of data sectors is then written onto each track in the wedges between the servo burst wedges. Each servo burst contains information that identifies the track that the head is positioned over as well as position data that indicates the position of the head relative to adjacent tracks and the centerline of the current track.

A servo control system typically controls the rotational position of a rotary actuator to position the head over the desired track and maintains that position during the read or write process for data from or to the desired track. The servo control system utilizes the servo burst information to maintain the head's position directly over the desired track by detecting whether the head is straying from the track centerline and by applying a correction to the actuator to correct the head's position.

During track-following which occurs during read or write processes, the head reads position related information at each servo burst which may be converted by a state estimator, with reference to currently and previously measured and predicted values, into a predicted current position, velocity, and acceleration for the head and possibly other parameters as well. From these position related values, it can be determined whether the head position had an unacceptable chance of exceeding the bounds of the track in the previous wedge or whether the head position has an unacceptable chance of exceeding the bounds of the track in the subsequent or following wedge. The head may move beyond the side to side bounds of the track for many reasons such as shock events that impose an unexpected force upon the actuator. Furthermore, the head position may appear to have exceeded the bounds of the track because a servo burst is bad even though the head may have remained on-track.

During a data writing operation, a conventional disc drive control system first determines whether the head has the appropriate position values such that the data written in the data sectors of the previous wedge was properly on-track. The control system also determines whether the head is in the appropriate position and dynamic state such that the data to be written in the following wedge will be properly on-track. If the first determination indicated that the head exceeded the track bounds of the previous wedge or that the head will exceed the bounds in the following wedge, the data in the previous wedge is not validated and the write is retried. The data for both the previous wedge and the following wedge remains in the disc drive buffer and after a revolution of the disc, the disc drive control attempts to rewrite the data and then again determines whether the head remained in-bounds for the previous wedge and whether it will continue to remain in-bounds for the following wedge.

Typically, this retry for the previously written data and the data for the following wedge is not troublesome because the disc drive can maintain the data to be rewritten in the buffer and can indicate to the host that data should be withheld from the disc drive until the buffer has vacancies. However, when the data is time-critical, such as in cases where the data streams to the disc drive and cannot be temporarily stopped at the source (i.e., digital cable), the extra time that the previously written data remains in the buffer would result in a loss of data that is streaming to the disc drive if the buffer has no vacancies. In most time-critical situations, the data to be received and written to the disc will far exceed the capacity of the buffer. Thus, the extra revolutions required for rewrites during which the data to be rewritten remains in the buffer results in incoming streaming data having no place to go and therefore, being lost.

Accordingly there is a need for a method that improves the disc drive's ability to handle writing of time-critical data.

SUMMARY OF THE INVENTION

Against this backdrop, embodiments of the present invention have been developed. The disc drive embodiments of the present invention involve independently deciding whether to qualify the data in just-written sectors in one wedge between servo bursts and deciding whether to allow writing of sectors in the next wedge between servo bursts. Alternatively, the data handling embodiments of the present invention involve independently deciding whether to qualify data just transmitted and whether to allow transmission of the next data.

An exemplary method for writing data in accordance with the present invention to a disc in a disc drive that has a transducer head, a buffer containing the data, and a plurality of tracks and servo bursts defined on the disc involves several steps. The method involves first writing data to a plurality of data sectors between a first servo burst and a second servo burst on a track. The recoverability of data written between the first and second servo bursts is then determined. Buffer locations containing data written in one or more of the plurality of data sectors between the first servo burst and the second servo burst is released from the buffer are made available if the recoverability is acceptable. Then an amount of encroachment of the head upon an adjacent track between the second servo burst and a third servo burst is predicted, and data is written to one or more data sectors between the second servo burst and the third servo burst only if the amount of encroachment is within predetermined acceptable units.

An exemplary disc drive for writing data to a disc in accordance with the present invention has a plurality of tracks and servo bursts and a buffer configured to hold the data to be written to the disc. The disc drive also includes a transducer head having a controllable position and configured to write a plurality of data sectors between a first servo burst and a second servo burst on a track. A processor is also included and is configured to determine a recoverability of data written between the first and second servo bursts and to make buffer locations holding the data written in one or more data sectors between the first servo burst and the second servo burst available if the recoverability is acceptable. The processor is further configured to predict an amount of encroachment of the head upon an adjacent track between the second servo burst and a third servo burst and to cause the head to write data to one or more sectors between the second servo burst and the third servo burst if the amount of encroachment is within predetermined acceptable units.

An exemplary data handling system for transmitting data from a first location to a second location in accordance with the present invention has a transmission medium linking the first location to the second location that is configured to carry the data being transmitted. A statistical dependence in a transmission quality exists between temporally-close periods of transmission through the medium. The data handling system also includes a processor configured to detect information about a prior transmission period, generate a first probability estimate that data was successfully transmitted in the prior transmission period, and determine whether to cause a retransmission of data transmitted in the prior transmission period based on the first probability estimate. The processor is further configured to predict a capability of a next transmission period, generate a second probability estimate that data will be transmitted successfully in the next transmission period, and determine whether to attempt transmission during the next transmission period based on the second probability estimate.

These and various other features as well as advantages which characterize the present invention will be apparent from a reading of the following detailed description and a review of the associated drawings.

DETAILED DESCRIPTION

Figure 1:
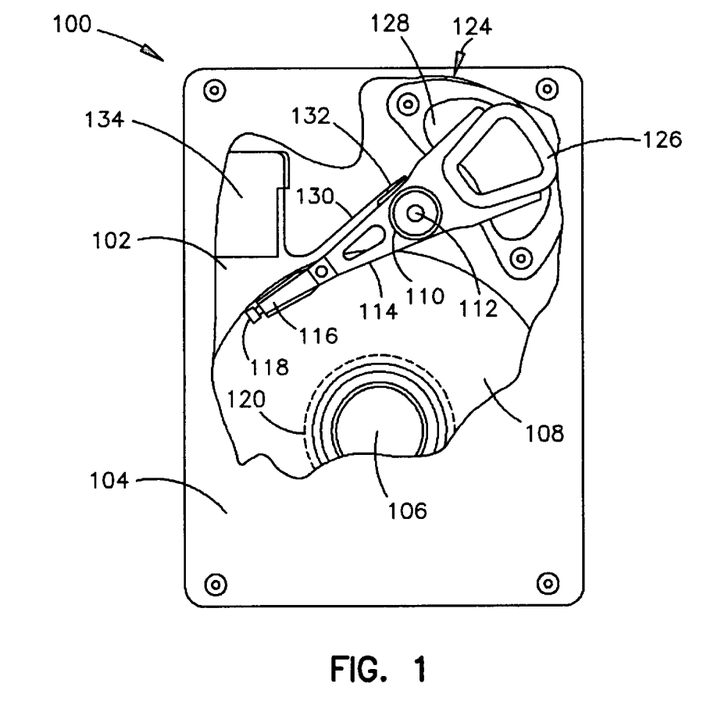
FIG. 1 is a plan view of a disc drive incorporating a preferred embodiment of the present invention showing the primary internal components.

A disc drive 100 constructed in accordance with a preferred disc drive embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks (not shown) on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are typically moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a preamplifier printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
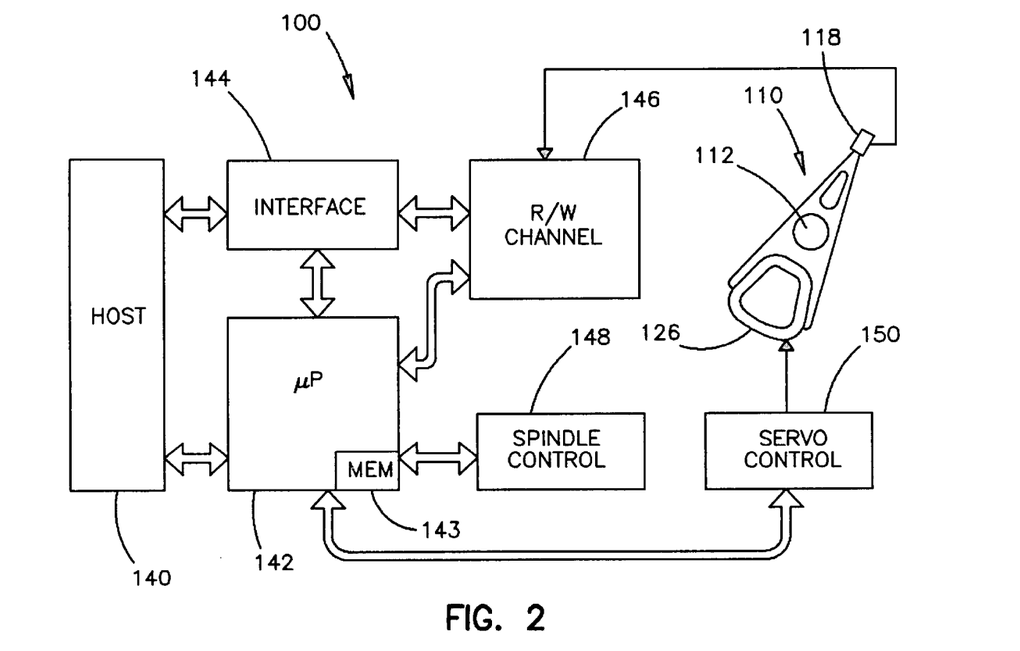
FIG. 2 is a functional block diagram of the disc drive control of the disc drive shown in FIG. 1 incorporating an embodiment of the present invention.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the disc drive 100, read signals are generated by the heads 118 and provided to the read/write channel 146, which performs decoding and error detection and correction operations and outputs the retrieved data to the interface 144 for subsequent transfer to the host computer 140 or other device. Such operations of the disc drive 100 are well known in the art and are discussed, for example, in U.S. Pat. No. 5,276,662 issued Jan. 4, 1994 to Shaver et al.

Figure 3:
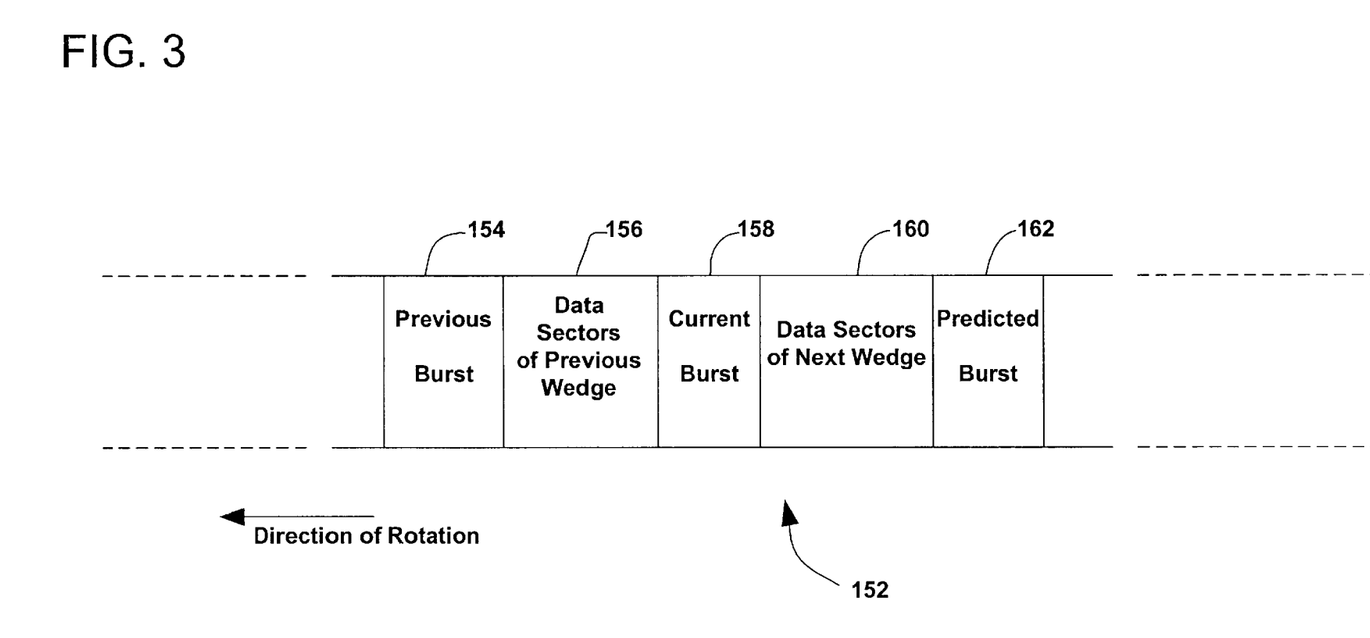
FIG. 3 is a diagram of a portion of a magnetic data storage disc in the drive in FIG. 1 illustrating a track on the magnetic disc having servo bursts and data wedges filled with data sectors.

FIG. 3 illustrates portions of an exemplary track 152 on one of the discs 108. The track 152 contains several spaced servo bursts. Three bursts 154, 158, and 162 are shown for exemplary purposes. Data wedges 156 and 160 lie between adjacent servo bursts and each contains several data sectors. As shown the disc, and thus the track, rotates in a the direction shown by the arrow such that at the instant shown, the head 118 is positioned over the current burst 158, and the previous servo burst 154 and the previous data wedge 156 have already rotated under the head 118. The next wedge 160 and the next burst 162 will rotate under the head 118 next, i.e., after the current burst 158.

The next burst 162 is referred to as the predicted burst because, as will be explained below, the state estimator implemented by either the microprocessor 142 or the servo control 150 may predict the position values for the current burst 158 and the next burst 162 while the head is still located over the current burst 158. The microprocessor utilizes the predicted position values along with the measured position values taken at the current burst 158 to make decisions regarding the write process.

Figure 4:
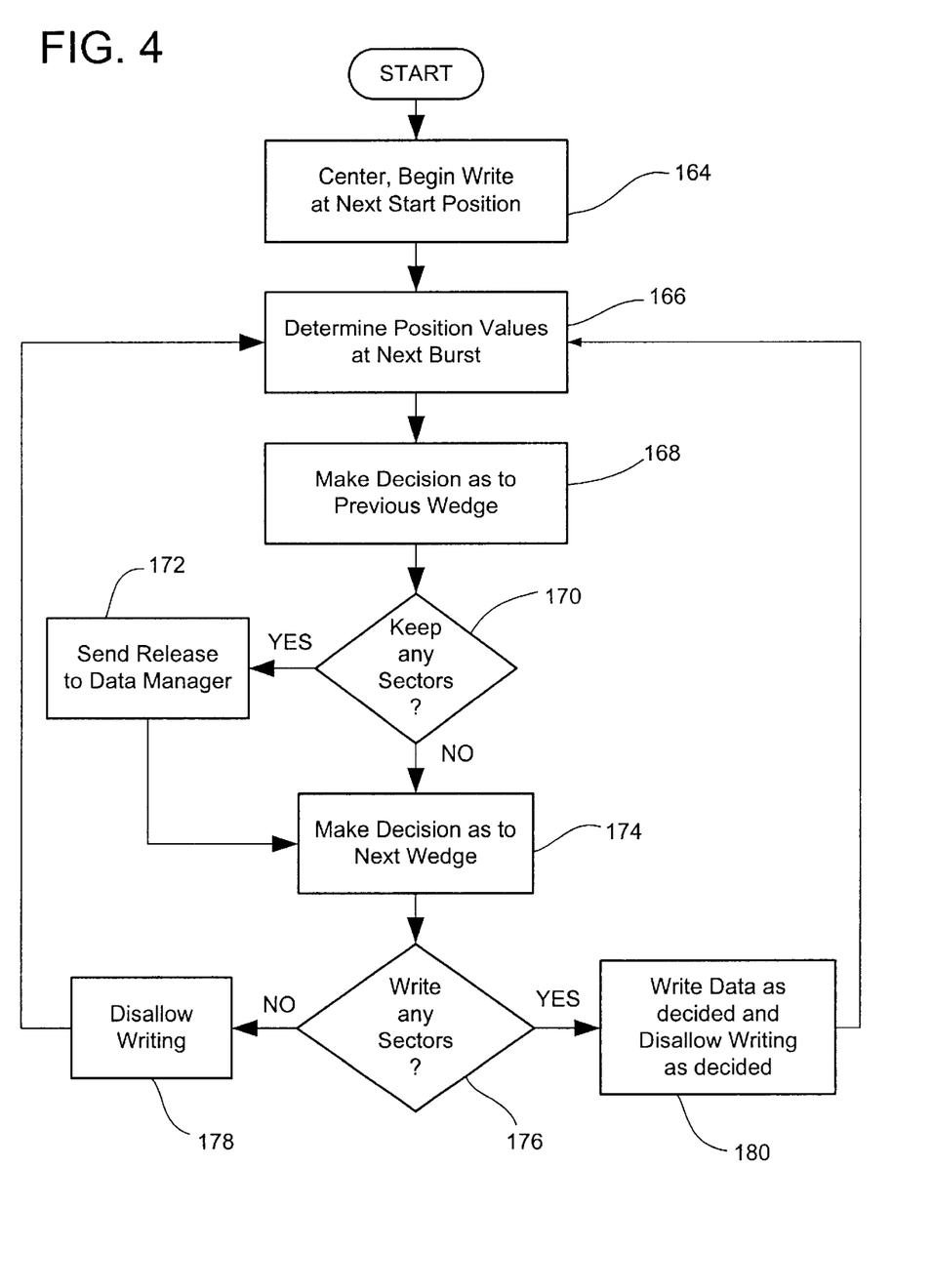
FIG. 4 is a flow diagram illustrating the operational sequence of the write validation process in accordance with a preferred embodiment of the present invention.

FIG. 4 illustrates the operational flow of the write validation process utilized by an exemplary embodiment of the present invention. The process begins at Track operation 164 where the head 118 is centered over the desired track and then begins writing data once a start position is reached. The start position may be at a burst, at a sector boundary within a wedge, or mid-sector such as where a first portion of a data sector has been written in a previous pass and a second portion remains to be written.

After the sectors for the wedge have traveled by the head 118, the next burst (i.e., current burst) arrives at the head 118 and the current head position, velocity, acceleration, and possibly other parameters may be measured and/or predicted at Burst operation 166. After these position values are computed, Decision operation 168 resolves whether the data sectors written for the previous wedge 156 are recoverable (i.e., readable by the head 118 in subsequent passes) based upon the position value determination for the previous burst 154 and the position values computed for the current burst 158. The logic for the decision-making process implemented by the microprocessor in Decision operation 168 is discussed below, with reference to Table A.

Query operation 170 detects whether a decision was made that some or all of the sectors written within the previous wedge 156 are recoverable. If one or more data sectors are recoverable, as determined by Decision operation 168, the query operation detects that the one or more sectors are valid and control passes to Data operation 172. In this operation 172, a release signal is provided to a data manager, typically implemented by the disc drive control system, by the microprocessor 142. The data manager performs the bookkeeping for the data that is received from the host 140 and is to be written. The data manager tracks whether data is loaded into the buffer and whether it has been successfully written. Once the data manager is instructed that the data in the one or more sectors was successfully written by receiving the release signal, the data manager then records that the buffer locations holding the data for the one or more sectors are available to create vacancies for the data streaming from the host.

After the Data operation 172 causes the buffer to be updated by recording that the buffer locations are available, process control transfers to Decision operation 174. Had query operation 170 detected that no sectors were recoverable, process control would have transitioned directly to Decision operation 174 without recording available locations in the buffer, since the data may be maintained so that a retry can be attempted for that data if time and buffer space permits. If some sectors are successfully written, the data for the sectors not successfully written may also be maintained in the buffer so that a retry can be attempted for that unsuccessfully written data if time and buffer space permits.

At Decision operation 174 the microprocessor 142 decides whether any data sectors will be written for the next wedge based on the head's position values as computed for the current burst 158 and as predicted for the predicted or next burst 162 by the state estimator. Again, this decision-making process is based on the logic discussed below with reference to Table A. Control then transfers to Query operation 176.

Query operation 176 detects whether a decision was made to write one or more of the sectors in the next wedge 160. If no sectors are to be written in the next wedge 160, then Write operation 178 causes the read/write channel 146 to stop writing data to the track. Typically, this decision is made because the head is too far from the center of the track at the current burst 158 or is predicted to be too far from the center of the track at or before the predicted burst 162 as the head has traverses the next wedge 160 and therefore, will encroach upon an adjacent track too severely. After writing the data to the next wedge 160 has been prevented, process control returns to Burst operation 166 which awaits the passing of the next burst, formerly the predicted burst but now the current burst, by the head 118. The process then continues as before, but no sectors from the previous wedge will be deemed recoverable since no data was written. The data for the wedge just traversed may be maintained in the buffer in case a retry is performed.

If query operation 176 detects that one or more sectors will be written for the next wedge 160, flow transitions to Wedge operation 180. At this operation, data is written to sectors as has been decided at Decision operation 174. Some or all sectors of the wedge may be written. When not all data sectors will be written between the current burst 158 and the predicted burst 162, the sectors that are written may be located contiguous to the current burst 158 but do not continue across the whole wedge. Once these sectors have been written, Wedge operation 180 prevents the remaining sectors in the wedge from being written.

Alternatively, the partial amount of sectors to be written may lie contiguous to the predicted burst 162 but do not extend back to the current burst 158. In this case, Wedge operation 180 at the current burst 158 prevents subsequent sectors from being written but then at some point within the next wedge 160 causes data to be written for the remaining sectors. In either case, flow returns to Burst operation 166 once the head 118 has arrived at the predicted burst 162 which becomes the current burst 158. The process then continues, but since some or all of the sectors in the previous wedge 156 have been written, Decision operation 168 makes a meaningful determination as opposed to automatically deciding to maintain all data in the buffer.

Table A is shown below to demonstrate exemplary logic for the decision-making operations of the write validation process. The rows of the table illustrate the eight possible scenarios as determined by the process described above. For each scenario, the two resulting decisions are shown. The column indicating whether to qualify the just-written sectors corresponds to the decision made at Decision operation 168. The column indicating whether to allow writing of the next sectors corresponds to the decision made at Decision operation 174.

TABLE A

| Scenario | Previous Position | Current Position | Predicted Position | Qualify Just-Written Sectors | Allow Writing of Next Sectors |
|---|---|---|---|---|---|
| 1 | Bad | Bad | Bad | No (no data written) | No |
| 2 | Bad | Bad | Good | No (no data written) | No, or Partially |
| 3 | Bad | Good | Bad | No, or Partially | No, or Partially |
| 4 | Bad | Good | Good | No, or Partially | Yes |
| 5 | Good | Bad | Bad | No, or Partially | No |
| 6 | Good | Bad | Good | No, or Partially | No, or Partially |
| 7 | Good | Good | Bad | Yes | No, or Partially |
| 8 | Good | Good | Good | Yes | Yes |

The position value calculated for the current burst 158 (i.e., current position) is bad when the head 118 is off track-center by an unacceptable amount at the current burst or that the head's predicted velocity or other dynamic parameter indicates that the head has been off-track by an unacceptable amount just before the burst or is about to go off-track after the burst by an unacceptable amount. The position value calculated for the previous burst 154 (i.e., previous position) is bad when the head 118 had a bad current position value when located at the previous burst. The predicted position is bad when the state estimator predicts a position for the head 118 that is off track-center by an unacceptable amount or predicts the head's velocity or other dynamic parameter which indicates that the head will be off-track by an unacceptable amount just before the predicted burst 162 or will go off-track after the predicted burst 162 by an unacceptable amount. As mentioned, a bad position value may occur due to several reasons such as a shock event causing the head to move off of track-center or from reading a bad burst (i.e., gray code is invalid, signal amplitude is practically nonexistent, quadrature amplitudes are contradictory, etc.).

The first scenario shows that the previous position and the current position are bad. The data from the previous wedge is not qualified since the data that was written is most likely not recoverable. Assuming the state estimator correctly predicted that the current position would be bad (see the last column for this and the fifth scenario), the just-written sectors were not actually written and thus, there was no data to qualify. Since the current position and the predicted position are both bad, no data will be written to the next wedge since the head 118 will most likely encroach upon an adjacent track.

The second scenario also shows that the previous position and the current position are bad, and therefore, no sectors will be qualified. Again, assuming that the state estimator correctly predicted that the position would be bad, no data would have been written in the previous wedge. The number of sectors within the next wedge that will be written will be determined based upon how severely the head 118 is off-track at the current burst since the state estimator indicates that the head 118 will have satisfactory parameters by the next burst. Some sectors near the predicted burst may be written (i.e., partially writing next sectors). Otherwise, no sectors within the wedge will be written on this pass.

The third scenario shows that the previous position is bad but the current position is good. In this case, some of the sectors in the previous wedge may be qualified, and the data locations in the buffer are made available. The sectors that may be qualified are near the current burst, and the number to be qualified depends upon the severity of the head's parameters at the previous burst. The predicted position is bad so some of the sectors in the following wedge that are near the current burst may be written, depending upon the severity of the head's predicted parameters.

The fourth scenario also shows a bad previous position but a good current position. Again, some of the sectors in the previous wedge and near the current burst may be qualified. In this scenario, the state estimator has computed that the predicted burst will be good. Therefore, all of the sectors will be written in the next burst and may be qualified to enable the buffer locations to be made available.

The fifth scenario shows a good previous position but a bad current position. In this situation, some of the data sectors near the previous burst may have been written (see the last column for the second and sixth scenarios) and may be qualified to enable locations in the buffer to be partially made available. The predicted position, along with the current position is bad, so no data sectors will be written in the following wedge.

The sixth scenario also shows a good previous position but a bad current position. Again, some of the data sectors near the previous burst may have been written and may be qualified. In this scenario, the predicted position is good so some of the data sectors near the predicted burst in the following wedge may be written depending upon the severity of the current position.

The seventh scenario shows a good previous position and a good current position. Therefore, all data sectors written in the previous burst will be qualified and the corresponding data locations in the buffer will be made available. The predicted position is bad, so only the data sectors closest to the current burst may be written, depending upon the severity of the predicted position.

The eighth scenario shows a good previous position, good current position, and a good predicted position. Therefore, all of the data sectors in the previous wedge will be qualified and the corresponding data locations will be released made available in the buffer. All of the data sectors in the following wedge will be written as well, and the corresponding locations will be made available in the buffer if the predicted burst, which will become the current burst, is determined to be good as predicted once the head has arrived.

In these scenarios, employing a separate shock sensor to detect a shock event and to stop writing of data may be desirable to allow a partial amount of sectors within a wedge to be written with less chance for loss of data in adjacent tracks. This is especially true if partially writing sectors into the next wedge because the current position is bad but the predicted position is good.

In summary, the embodiments of the present invention may be viewed as a method for writing data to a disc of a disc drive having a head, a buffer containing the data, and a plurality of tracks and servo bursts on the disc. The method includes writing a plurality of data sectors with the head to a track between a first servo burst and a second servo burst (such as in operation 164). A recoverability of data written between the first and second servo bursts is detected (such as in operation 168). Buffer locations holding the data written in one or more of the plurality of data sectors between the first servo burst and the second servo burst buffer are made available if the recoverability is acceptable (such as in operation 172). An amount of encroachment of the head upon an adjacent track between the second servo burst and a third servo burst is predicted (such as in operation 174). Data is written to one or more data sectors between the second servo burst and the third servo burst if the amount of predicted encroachment is acceptable (such as in operation 180).

The detecting step of the method may include detecting a first head position value for the first servo burst (such as in operation 166), detecting a second head position value for the second servo burst (such as in operation 166), and computing the recoverability from the first head position value and the second head position value (such as in operation 168).

The predicting step may include detecting a second head position value for the second servo burst (such as in operation 166), estimating a third head position value for the third servo burst (such as in operation 166), and computing the amount of encroachment from the second head position value and the third head position value (such as in operation 174).

In the method, the first and second head position values used in the detecting step (such as in operation 168) may be based at least upon the measured position of the head. In the method, the second and third head position values used in the predicting step (such as in operation 174) may be based at least upon the current and predicted positions of the head. The method may also include a step of receiving streaming data into the buffer (such as in operation 164). In the method, the recoverability may be determined for each data sector (such as in operation 168). In the method, the amount of encroachment may be determined for each data sector (such as in operation 174). In the method, the disc drive may further includes a shock sensor, and the method further includes a step of terminating the writing steps in response to detecting a shock event with the shock sensor (such as in operation 180).

The embodiments of the present invention may also be viewed as a disc drive (such as disc drive 100) for writing data to a disc having a plurality of tracks (such as track 152) and servo bursts (such as burst 154). The drive also includes a buffer (such as in interface 144) configured to hold the data to be written to the disc. The drive also includes a head (such as head 118) having a controllable position and configured to write a plurality of data sectors to the disc between a first servo burst and a second servo burst. The drive also includes a processor (such as processor 142) configured to detect a recoverability of data written between the first and second servo bursts and to make available buffer locations holding data written in one or more data sectors between the first servo burst and the second servo burst if the recoverability is acceptable. The processor is further configured to predict an amount of encroachment of the head upon an adjacent track between the second servo burst and a third servo burst and to cause the head to write data to one or more sectors between the second servo burst and the third servo burst if the amount of encroachment is acceptable.

The processor (such as processor 142) may also be configured to detect the recoverability by detecting a first head position value for the first servo burst, detecting a second head position value for the second servo burst, and computing the recoverability from the first head position value and the second head position value.

The processor (such as processor 142) may be configured to predict the amount of encroachment by detecting a second head position value for the second servo burst, detecting a third head position value for the third servo burst, and predicting the amount of encroachment from the second head position value and the third head position value.

In the disc drive, the first and second head position values detected by the processor may be based at least upon the position and velocity of the head (such as head 118). The second and third head position values detected by the processor may also be based at least upon the position and velocity of the head (such as head 118). The buffer (such as in interface 144) may be configured to receive streaming data. The processor (such as processor 142) may be configured to detect the recoverability for each data sector. The processor (such as processor 142) may be configured to predict the amount of encroachment for each data sector. The disc drive may include a shock sensor (such as in head 118) configured to interrupt the head from writing data between the first and second servo bursts or between the second and third servo bursts in response to detecting a shock event.

The embodiments of the present invention may additionally be viewed as a data handling system for transmitting data from one location to another, such as over a network. The data handling system includes a transmission medium linking the first location to the second location that is configured to carry the data being transmitted, wherein a statistical dependence in a transmission quality exists between temporally-close periods of transmission. The data handling system further includes a processor configured to detect information about a prior transmission period, generate a first probability estimate that data was successfully transmitted in the prior transmission period, and determine whether to cause a retransmission of data transmitted in the prior transmission period based on the first probability estimate. The processor is further configured to predict a capability of a next transmission period, generate a second probability estimate that data will be transmitted successfully in the next transmission period, and determine whether to attempt transmission during the next transmission period based on the second probability estimate.

In the data handling system, the transmission medium may be the Internet. The first and/or second probability estimates may be based upon transmission errors determined through ordinary error checking methods. The data handling system may also include a buffer for holding the data transmitted in the prior transmission period and data to be transmitted in the next transmission period. The transmission medium may be an alternative to the Internet, such as a local area network.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, partial writing of a wedge's data sectors may always be avoided. Also, partial-sector writing within a wedge may be employed, such as when a sector is partially written within the previous wedge and must be finished within the following wedge. Furthermore, techniques other than those discussed above may be used for determining whether the data in a wedge is recoverable and whether the head has or will encroach upon adjacent tracks.

Additionally, bad bursts may be ignored rather than considered as indicating a bad position and therefore, the writing and validation process continues past the bad burst. In that case, the write validation decisions may be made for the two wedges surrounding the bad burst at the following good burst. The present invention may be implemented in software, firmware, or hardware employed by the disc drive. Numerous other changes may be made which will readily suggest themselves to those skilled in the art and which are encompassed in the spirit of the invention disclosed and as defined in the appended claims.

What is claimed is:

1. A method for writing data to a data storage disc in a disc drive having a transducer head, a buffer containing the data, and a plurality of tracks and servo bursts on the disc, comprising steps of:
    a) writing a plurality of data sectors with the head to a track between a first servo burst and a second servo burst;
    b) determining a recoverability of the data written between the first and second servo bursts from the first and second servo bursts;
    c) making buffer locations holding the data written in one or more of the plurality of data sectors between the first servo burst and the second servo burst available if the recoverability is acceptable;
    d) predicting an amount of encroachment of the head upon an adjacent track between the second servo burst and a third servo burst; and
    e) writing data to one or more data sectors between the second servo burst and the third servo burst if the amount of encroachment is acceptable.

2. The method of claim 1, wherein the determining step b) comprises steps of:
    b)(i) detecting a first head position value for the first servo burst;
    b)(ii) detecting a second head position value for the second servo burst; and
    b)(iii) computing the recoverability from the first head position value and the second head position value.

3. The method of claim 1, wherein the predicting step d) comprises steps of:
    d)(i) detecting a second head position value for the second servo burst;
    d)(ii) estimating a third head position value for the third servo burst; and
    d)(iii) computing the amount of encroachment from the second head position value and the third head position value.

4. The method of claim 2, wherein the first and second head position values are based at least upon the measured position of the head.

5. The method of claim 3, wherein the second and third head position values are based at least upon a current position and a previous position of the head.

6. The method of claim 1, further comprising a step f) of receiving streaming data into the buffer.

7. The method of claim 1, wherein the recoverability is determined for each data sector.

8. The method of claim 1, wherein the amount of encroachment is determined for each data sector.

9. The method of claim 1, wherein the disc drive further includes a shock sensor, the method further comprising a step g) of terminating the writing step a) or the writing step e) in response to detecting a shock event with the shock sensor.

10. A disc drive for writing data to a data storage disc having a plurality of tracks and servo bursts, comprising:
    a buffer configured to hold the data to be written to the disc;
    a head having a controllable position and configured to write a plurality of data sectors to the disc between a first servo burst and a second servo burst;
    a processor configured to determine a recoverability of data written between the first and second servo bursts from the first and second servo bursts, configured to make locations in the buffer holding the data written in one or more data sectors between the first and second servo bursts available if the recoverability is acceptable, configured to predict an amount of encroachment of the head upon an adjacent track between the second servo burst and a third servo burst, and configured to cause the head to write data to one or more sectors between the second and third servo bursts if the amount of encroachment is acceptable.

11. The disc drive of claim 10, wherein the processor is configured to determine the recoverability by detecting a first head position value for the first servo burst, detecting a second head position value for the second servo burst, and computing the recoverability from the first head position value and the second head position value.

12. The disc drive of claim 10, wherein the processor is configured to predict the amount of encroachment by detecting a second head position value for the second servo burst, detecting a third head position value for the third servo burst, and predicting the amount of encroachment from the second head position value and the third head position value.

13. The disc drive of claim 11, wherein the first and second head position values detected by the processor are based at least upon the measured position of the head.

14. The disc drive of claim 12, wherein the second and third head position values detected by the processor are based at least upon a current position and a previous position of the head.

15. The disc drive of claim 10, wherein the buffer is further configured to receive streaming data.

16. The disc drive of claim 10, wherein the processor is further configured to determine the recoverability for each data sector.

17. The disc drive of claim 10, wherein the processor is further configured to predict the amount of encroachment for each data sector.

18. The disc drive of claim 10 further comprising a shock sensor configured to interrupt the head from writing data between the first and second servo bursts or between the second and third servo bursts in response to detecting a shock event.

19. A disc drive for writing data, comprising:

a buffer having locations for holding data; and means for making locations holding data written in a first wedge available for receiving more data after writing the data by determining the predicted recoverability of the data written from adjacent servo bursts defining said first wedge and for writing data contained in other locations holding data to a second wedge.

20. The disc drive of claim 19, further comprising:

a head having a controllable position and a controller configured to write a plurality of data sectors to the disc between a first servo burst and a second servo burst; and wherein the means is configured to determine a recoverability of data written between the first and second servo bursts from the first and second servo bursts, configured to make locations in the buffer holding the data written in one or more data sectors between the first and second servo bursts available if the recoverability is acceptable, configured to predict an amount of encroachment of the head upon an adjacent track between the second servo burst and a third servo burst from the second servo burst, and configured to cause the head to write data to one or more sectors between the second and third servo bursts if the amount of predicted encroachment is acceptable.

21. The disc drive of claim 20, wherein the means is configured to determine the recoverability by detecting a first head position value for the first servo burst, detecting a second head position value for the second servo burst, and computing the recoverability from the first head position value and the second head position value.

22. The disc drive of claim 20, wherein the means is configured to predict the amount of encroachment by detecting a second head position value for the second servo burst, detecting a third head position value for the third servo burst, and predicting the amount of encroachment from the second head position value and the third head position value.

23. The disc drive of claim 22, wherein the first and second head position values detected by the means are based at least upon the measured position of the head.

24. The disc drive of claim 23, wherein the second and third head position values detected by the means are based at least upon a current position and a previous position of the head.

* * * * *